United States Patent [19]
Schylander

[11] Patent Number: 5,390,159
[45] Date of Patent: Feb. 14, 1995

[54] RECORD CARRIER, READING APPARATUS FOR READING A RECORD CARRIER, AND METHOD AND RECORDING APPARATUS FOR RECORDING INFORMATION ON A RECORD CARRIER

[75] Inventor: Erik C. Schylander, Eindhoven, Netherlands

[73] Assignee: U.S. Philips Corporation, New York, N.Y.

[21] Appl. No.: 180,002

[22] Filed: Jan. 11, 1994

Related U.S. Application Data

[63] Continuation of Ser. No. 817,579, Jan. 7, 1992, abandoned.

[30] Foreign Application Priority Data

Apr. 2, 1991 [EP] European Pat. Off. ............ 91200764
Apr. 26, 1991 [EP] European Pat. Off. ............ 91201005

[51] Int. Cl.$^6$ .............................................. G11B 5/09
[52] U.S. Cl. ......................................... 369/48; 369/32; 369/47; 369/54; 369/59; 369/116; 369/124
[58] Field of Search ............... 369/47, 48, 59, 54, 369/116, 288, 32, 124

[56] References Cited

U.S. PATENT DOCUMENTS

| | | | |
|---|---|---|---|
| 4,094,013 | 6/1978 | Hill et al. | 360/78 X |
| 4,999,825 | 3/1991 | Raaymakers et al. | 369/47 X |
| 5,001,692 | 3/1991 | Farla et al. | 369/48 |
| 5,060,219 | 10/1991 | Lokhoff et al. | 369/48 |
| 5,065,388 | 11/1991 | Roth et al. | 369/47 |
| 5,072,435 | 12/1991 | Bakx | 369/48 |
| 5,114,519 | 5/1992 | Horie | 369/48 |
| 5,124,966 | 6/1992 | Roth et al. | 369/47 |
| 5,341,356 | 8/1994 | Dieleman et al. | 369/47 |

OTHER PUBLICATIONS

"Compact Disc Interactive Full Functional Specification", published by NV Philips and Sony Corporation, Mar. 1993.
ISO 9660 Standard. Apr. 15, 1988.

Primary Examiner—Robert J. Pascal
Assistant Examiner—Haissa Philogene
Attorney, Agent, or Firm—Richard A. Weiss

[57] ABSTRACT

A record carrier (21;70) is disclosed on which a first information volume (VOL1) is recorded in sectors of a track (10), the sector positions on the track being denoted by logic sector address numbers LSN. The recorded information volume (VOL1) comprises control information (PT;DF) for use in controlling the search for information therein, the control information being arranged according to a predetermined format. A reference to the control information is accommodated in track sectors (VD1) in a predetermined address range. Following the first information volume at least a next information volume (VOL2) is recorded in the track (10), each next information volume comprising substitute reference information for use in controlling the search for information both in that information volume and in the previously recorded information volumes. The substitute reference information is accommodated in track sectors (VD2) in a recoverable substitute address range which is preferably the same as the corresponding address range in the first recorded information volume. Reading apparatus for such record carrier transforms a request for access to sectors (VD1) in the address range of the first information volume (VOL1) into a request for access to sectors (VD2) in the substitute address range of the last-recorded information volume. A method and apparatus for recording information in the predetermined format is also disclosed.

35 Claims, 9 Drawing Sheets

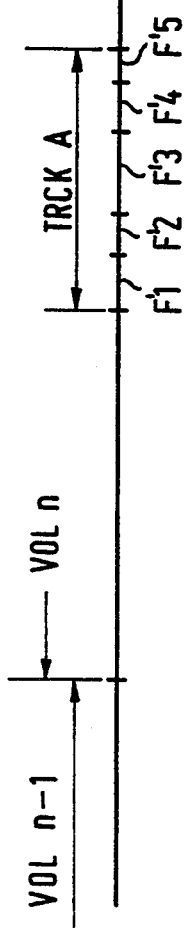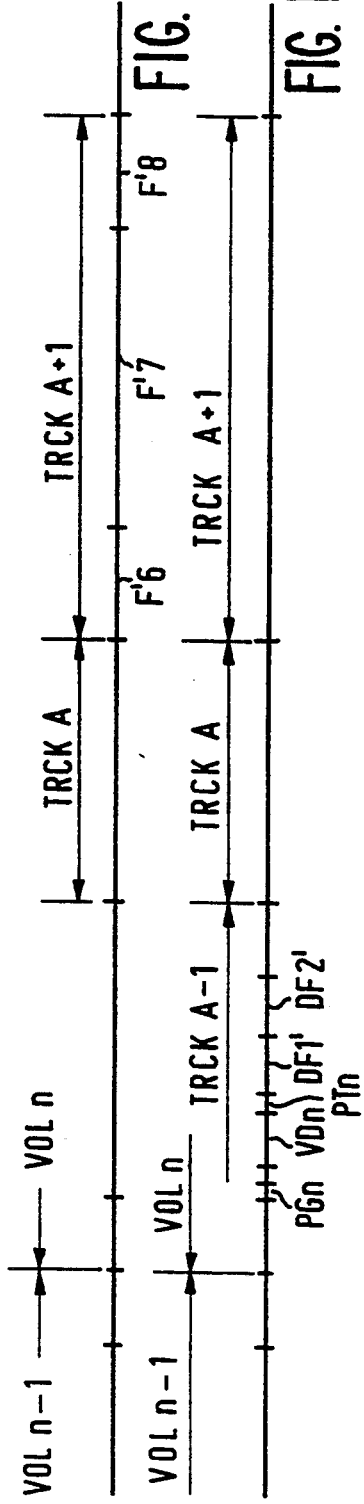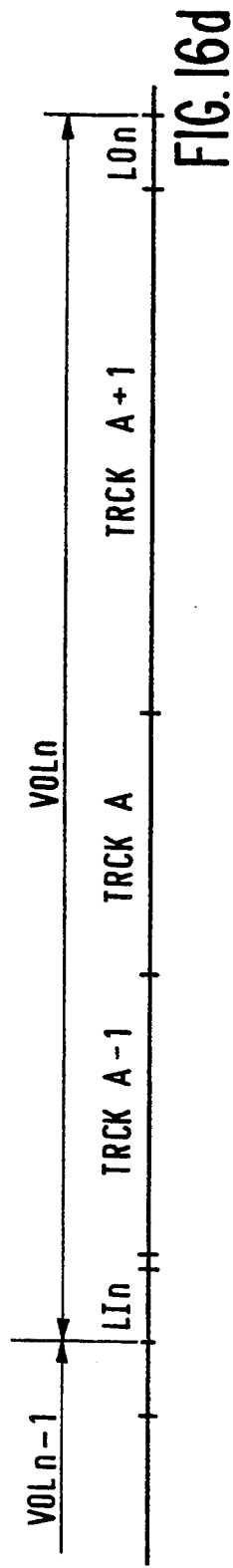

RECORD CARRIER, READING APPARATUS FOR READING A RECORD CARRIER, AND METHOD AND RECORDING APPARATUS FOR RECORDING INFORMATION ON A RECORD CARRIER

This is a continuation of pending prior application Ser. No. 07/817,579, filed on Jan. 7, 1992, now abandoned.

BACKGROUND OF THE INVENTION

1. Field of the Invention

The invention relates to a method of recording information on a record carrier, in which method an information volume (i.e., a set of files of data and/or other information) is recorded as sectors in a track of the record carrier. The information volume comprises a reference to control information for use in controlling the search for information in the recorded information volume, which reference is accommodated in one or more sectors within a predetermined address range.

The invention also relates to a recording apparatus for recording information on a record carrier, which apparatus comprises a recording unit for recording information in sectors in a track of the record carrier; and formatting unit for composing an information volume in accordance with predetermined formatting instructions, according to which instructions the information volume is provided with control information for use in controlling the search for information in the information volume; a control unit for causing the recording unit to record the information volume and to also record a reference to the control information in one or more sectors in a predetermined address range in the information volume.

The invention also relates to a reading apparatus for reading a record carrier on which information is recorded in sectors in a track of the record carrier, which sectors have addresses that indicate the positions at which information is recorded thereon. One or more sectors, having predetermined addresses, comprise a reference to control information for use in controlling the search for information in the sectors. Such apparatus comprises an address generating unit for generating addresses of sectors to be searched and a control unit for searching for information on the basis of the generated addresses.

Finally, the invention also relates to a record carrier on which an information volume is recorded in sectors in a track of the record carrier, which information volume comprises control information for use in controlling the search for information in the recorded information volume, and one or more sectors in a predetermined address range comprise a reference to the control information.

2. Description of the Related Art

A method, apparatus and record carrier of the type mentioned hereinbefore are known, for example, by the name of the CD-ROM system which is described, for example in the ISO 9660 standard. In the CD-ROM system, a volume descriptor is recorded in an address range beginning with the sector having a logic sector number (i.e., $LS_N$) 16. This volume descriptor comprises, for example, references to the sector address of a path table, which table comprises the directory structure and references to directory files. The path table and the directory files contain the necessary information for searching and reading the data files included in the recorded information volume, i.e., control information.

In the case where a record carrier of a write-once type is used for recording information composed in accordance with the CD-ROM format, a problem arises in that address information for newly added information cannot be located therein. For that matter, a reference to information necessary for controlling the reading operation with respect to the new added information cannot be included in the volume descriptor due to the fact that the record carrier can be written only once.

SUMMARY OF THE INVENTION

It is an object of the invention to provide a method and apparatus for resolving the aforesaid problems.

With respect to the method of the invention, after recording an information volume in a track of a record carrier, at least one additional information volume is recorded in the track following the end of the last-recorded information volume. Each additional information volume comprises a reference to substitute control information for use in controlling the search for information in that additional information volume and also in at least one previously-recorded information volume, which reference is accommodated in one or more sectors in a recoverable substitute address range.

With respect to the recording apparatus of the invention, it comprises a deriving unit for deriving further control information for use in searching for information in at least one additional information volume; a formatting unit for composing each additional information volume in accordance with the above-mentioned predetermined formatting instructions, and including therein control information for the searching for information in both that additional information volume and in at least one previously-recorded information volume; and a control unit for causing each additional information volume to be recorded following the end of the last previously-recorded information volume, and a reference to the control information being recorded in one or more sectors of a substitute address range within that additional information volume.

With respect to the record carrier of the invention, following to an information volume recorded in the track thereof at least one additional information volume having adapted control information for use in controlling the search for information in such an additional information volume is record in the track. Each additional information volume comprises a substitute reference to control information for use in controlling the search for information in both that additional information volume and in at least one preceding information volume, the substitute reference being in one or more sectors in recoverable substitute address range.

Since a substitute reference is included in each succeeding information volume, the control information necessary for locating relevant information is always recoverable. A substitute reference can be searched for in a simple manner by means of a reading apparatus which comprises a unit for substituting an address in a substitute address range for a generated address from a predetermined address range which denotes the sectors in which a (non-substitute) control information reference is included.

By substituting addresses referring to the substitute control information for addresses referring to the control information in the reading apparatus of the invention, modifications in the address generating unit may be omitted. This is especially advantageous in the case where the address generating unit is included in file managers of an operating system of a computer system included in the reading apparatus.

Adaptations in file managers are generally undesired because such modifications affect the operating system at a high hierarchical level. In the apparatus according to the invention, modifications may be restricted to modifications of the control unit. This narrows down to modifications in the device drivers of the operating system and modifications of the control hardware as required. These modifications do not affect the operating system at a high hierarchical level and are, thus, generally preferred.

The range of the sectors accommodating the substitute reference is preferably equal to the range in which the reference is included in the first recorded information volume. In that case, a one-to-one image is obtained for the format of the sector or sectors in which the substitute reference is included and the format of the sector or sectors of the first-recorded information volume that includes the reference. This is especially advantageous if the size of the address range that includes the reference to the required control information is not a predetermined one. In that case, the reading apparatus is able to determine the size of the range when the addresses within the range are to be substituted. When the range of the substitute control information and the range of control information in the first recorded information volume are equally large, the size of the range can be determined on the basis of the recoverability of the range in the first recorded information volume. To facilitate determining the size of the address range, it is preferable to include in the sectors of the address range information denoting the length of the address range, or to include a code in a sector at the end of the range which denotes the end.

A substitute reference to the control information is to be recorded at a recoverable position. This can be done in various ways. For example, it may be done by including a reference to the addresses of the sectors in which the substitute reference to the required control information is included at the end of each next information volume. The end of the last-recorded information volume may be recovered in a simple manner preferably by detecting by means of high-speed read signal detection whether information is recorded in the detected sector. The transition from a recorded sector to an unrecorded sector of the track then indicates the end of the last-recorded information volume. The reference information may be located by skipping from the detected end to a track portion just before the end. The detection of the end of the last-recorded information volume on the basis of the reading signal with high-speed detection is advantageous in that it can be found extremely rapidly.

The substitute reference may also be recovered in a simple manner if recorded in sectors at a given position relative to the beginning of an information volume. In that case, the substitute control information can be searched for in a next-recorded information volume on the basis of information representing the end of each previously-recorded information volume.

The invention is pre-eminently suitable for use when recording information on a record carrier of a write-once type and reading it therefrom, because it is impossible to overwrite already recorded control information with modified control information. However, the invention may be used for recording and reading information on and from record carriers of a rewritable type.

BRIEF DESCRIPTION OF THE DRAWINGS

Further embodiments will be described in detail hereinbelow with reference to the drawings of FIGS. 1 to 18, in which:

FIGS. 16a to 16d show, by way of illustration, the layout of the record carrier during successive stages of a method according to the invention.

BACKGROUND INFORMATION

Figure 1:
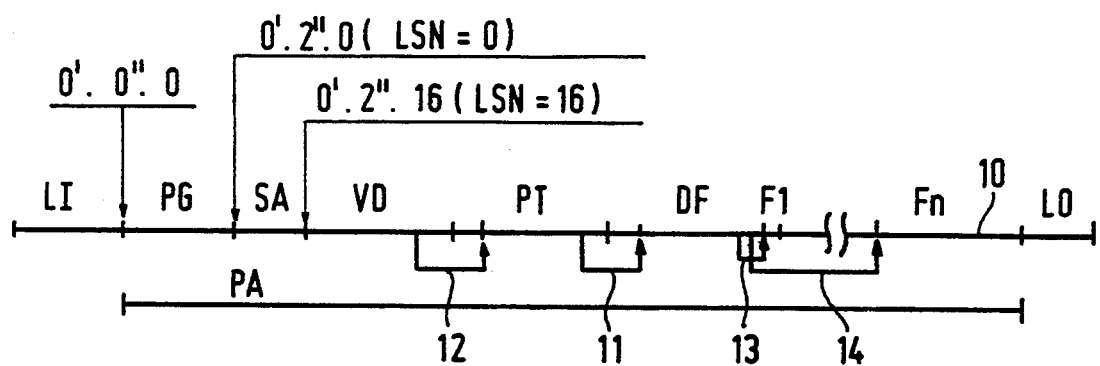
FIGS. 1 to 3 show a CD-ROM reading apparatus according to the state of the art.
Figure 2:
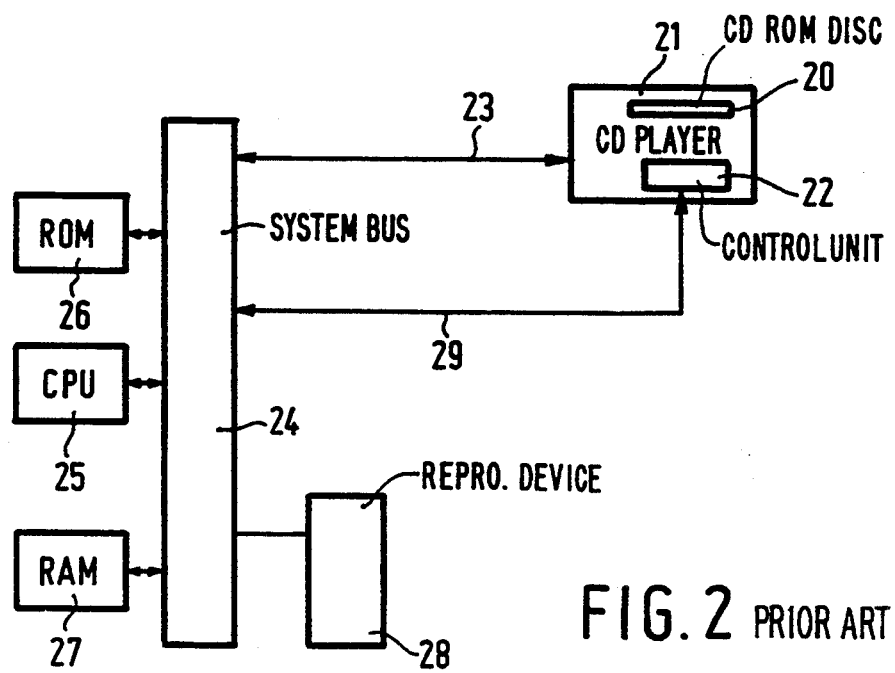
Figure 3:
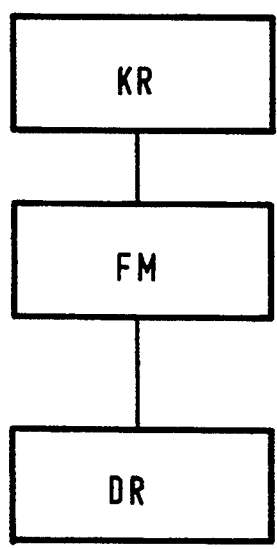

Before discussing the invention in detail, a prior-art CD-ROM system will be briefly described first with reference to FIGS. 1 to 3. A CD-ROM system comprises an optically readable disc on which information is recorded according to the CD-ROM standard, as described in the ISO 9660 standard, and a CD-ROM reading apparatus for reading the disc. The information recorded on the disc comprises main information and sub-code information. The sub-code information is subdivided into sub-code frames. The main information is subdivided into sectors.

FIG. 1 diagrammatically shows the layout of a track 10 of a CD-ROM disc. The track 10 comprises a lead-in (referenced LI), a program area (referenced PA) and a lead-out (referenced LO). The combination of the lead-in LI, the program area PA and the lead-out LO will henceforth be denoted an information volume.

The program area PA is intended for storing user information. The main information in the program area PA is subdivided into sectors having a length corresponding to that of a sub-code frame. Each of the sub-code frames in the program area PA comprises an absolute time code denoting the position at which that sub-code frame is recorded relative to the beginning of the program area PA. Each of the sectors also has an absolute time code corresponding to the absolute time code in the sub-code frame recorded together therewith.

The program area PA comprises a pregap referenced PG in which no main information is recorded and which can be used for synchronizing the readout. The pregap PG extends over a length referenced by the absolute time codes $0'.0''.0$ to $0'.2''.0$.

The pregap is followed by a system area reserved for use by the system. The system area extending from $0'.2''.0$ to $0'.2''.16$ is referenced by the letters SA.

The system area SA is followed by a volume descriptor (referenced VD) commencing at $0'.2''.16$ on each CD-ROM disc. The length of the volume descriptor VD is not fixed but depends on the selected use of the CD-ROM. The volume descriptor VD comprises information about its length and is terminated by a code pattern denoting the end thereof.

The program area PA further includes path table (referenced PT), one or more directory files (referenced DF) and user files (referenced F1, ..., Fn). The path table PT comprises information about the directory structure of the information stored on the disc and includes references to sector addresses of the directory files DF. In FIG. 1, the reference to the initial address of the directory file DF is denoted by line 11. The volume descriptor VD includes a reference, denoted by line 12, to the address of the sector in which the path table PT is stored. The directory file(s) comprise information about the structure of the user files F1, ...,Fn stored on the disc and include references, denoted by lines 13 and 14, for example, to addresses of the sectors in which the user files of the directory concerned, for example, F1 and Fn are stored. The path table PT and directory file DF comprise the control information necessary for searching for the user files F1, ...,Fn.

FIG. 2 diagrammatically shows a CD-ROM reading apparatus for reading a CD-ROM disc 20. The CD-ROM reading apparatus comprises a CD player 21 of which an output is coupled to a system bus 24 of a customary computer system for delivering the read information over a data signal path 23. Furthermore, a central processor 25, a ROM 26, a RAM 27 and one or more information reproducing devices 28 are connected to the system bus 24.

The CD player 21 comprises a control unit 22 for searching for information on the basis of sector addresses received over the control signal path 29. The control signal path 29 is also connected to the system bus 24.

Software for the central processor 25 is loaded in the ROM 26. This software customarily comprises an operating system. It is a task of the operating system, for example, to control and monitor the data transport between the elements of the equipment connected to the system bus.

FIG. 3 diagrammatically shows the structure of a customary operating system such as, for example, the OS9 operating system. Such an operating system comprises a kernel (referenced KR), a file manager (referenced FM) and a device driver (referenced DR). In the case where information is desirably read from the files present on the disc, the kernel KR will send an I/O request to the file manager FM. On the basis of the received I/O request, the file manager FM decides which sector or sectors are to be read out and indicates to the device driver DR, by means of one or more logic sector numbers (referenced LSN), which sector(s) of the disc are to be read out.

The logic sector numbers LSN do not match the absolute time codes in the sectors on the disc 20. However, there is a fixed relation between the logic sector numbers LSN and the absolute time codes. This relation is as follows: LSN=((((MIN*60)+SEC)*75+FR)−150) for the absolute time code MIN'.SEC".FR. This means that the first sector of the signal area SA is denoted LSN=0 and the first sector of the volume descriptor VD is denoted LSN=16. On the basis of the received logic sector number(s) LSN, the device driver DR derives the necessary control signals for the control unit 22 to search for the desired sector(s) and reads it out.

Before access can be gained to a requested user file, for example, file F1, the information in the volume descriptor VD, the path table PT and the directory file DF must have been read out. This reading operation takes place during the log-on procedure and/or in reaction to I/O requests made to this effect by the kernel KR. During this operation, the file manager FM sends corresponding logic sector numbers LSN to the device driver DR.

In the CD-ROM system described above, additional information made available at an instant later than the information previously-recorded cannot be read out. Until recently there was no objection to this because all CD-ROM discs were of the read-only type, so that it was impossible to add additional information to the disc after an initial recording. However, recording apparatus have been developed in which it is possible to record additional information according to a CD format on a write-once disc. Such a disc can also be read out by CD-ROM reading apparatus. For a more detailed description of the aforementioned recording apparatus and write-once record carriers reference can be made to the patent applications NL-A-8700655 and NL-A-8800152.

With the previously-described recording apparatus, it is possible to record additional information next to the already recorded information volume at a later instant. However, this additional information cannot be accessed by the existing CD-ROM reading system because the necessary information for doing so cannot be included in the path table PT and directory files DF due to the fact that the record carrier is of the write-once type.

DESCRIPTION OF THE PREFERRED EMBODIMENTS

Figure 4:
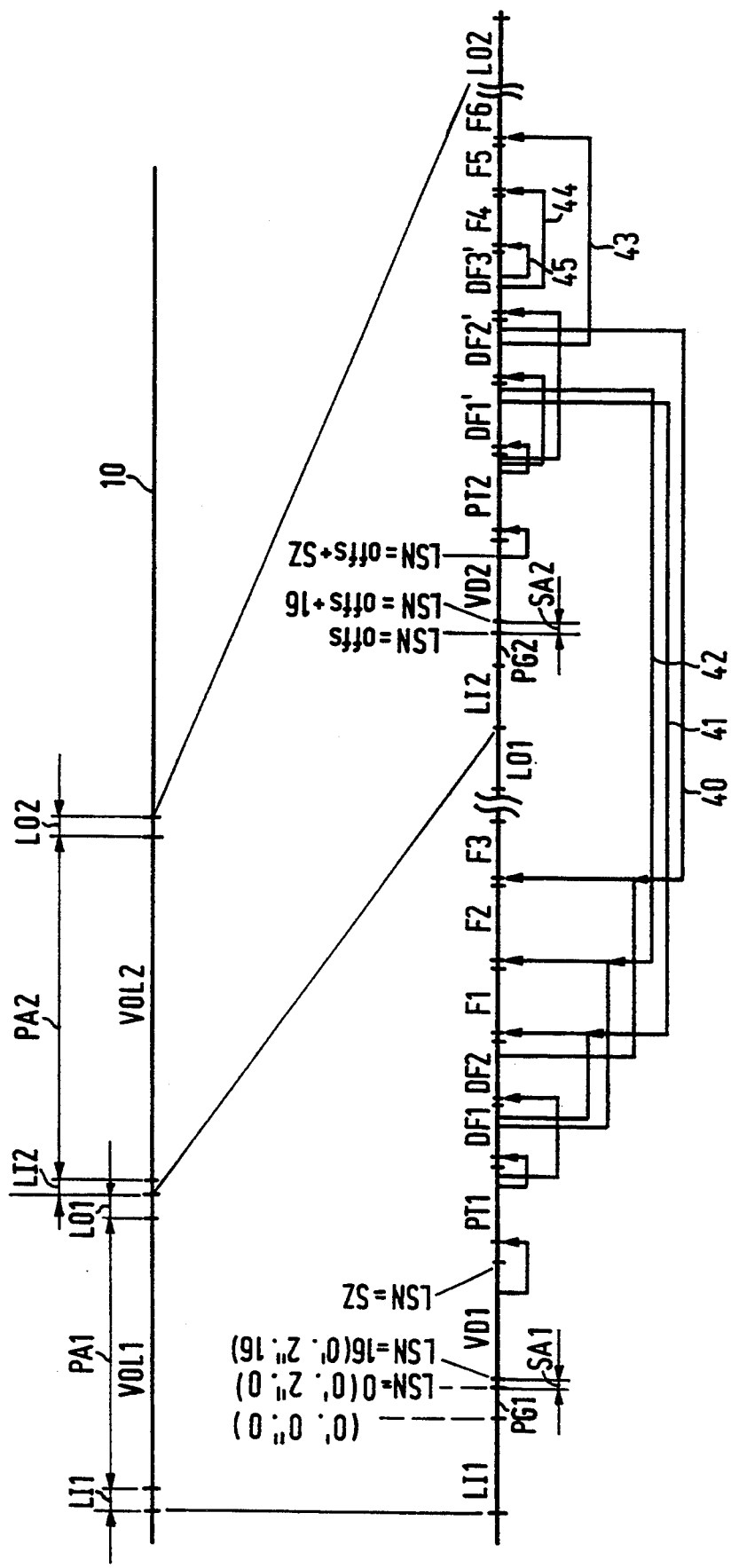
FIGS. 4 and 6 show embodiments for record carriers according to the invention.
Figure 5:
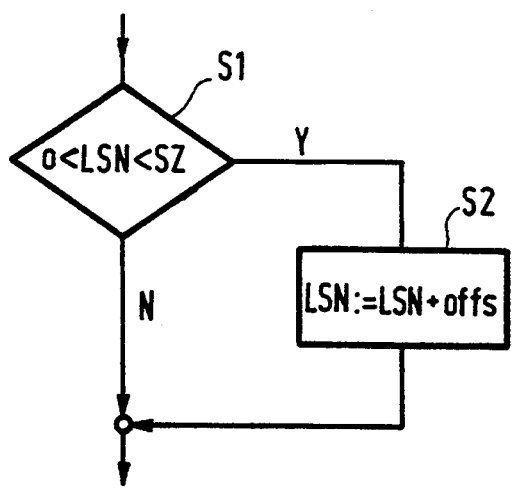
FIGS. 5, 7 and 10 show flow charts of programs executed by embodiments of a reading apparatus according to the invention.

With reference to FIGS. 4 and 5, embodiments for a reading apparatus and a record carrier according to the invention will be described. The embodiments are such that the aforementioned objections can be met.

FIG. 4 diagrammatically shows the layout of a track 10 on a disc 20. This track comprises a first information volume (referenced VOL1) comprising a lead-in (referenced LI1), a program area (referenced PA1) and a lead-out (referenced LO1), recorded in the same fashion as described with reference to FIG. 1. Contiguous to the information volume VOL1, a second information volume (referenced VOL2) is recorded at a later instant.

The information volume VOL2 of FIG. 4 comprises a lead-in (referenced LI2), a program area (referenced PA2) and a lead-out (referenced LO2). The information in the program area PA2 is arranged in a similar fashion to the information in the program area PA1, i.e., a system area (referenced SA2) and a volume descriptor (referenced VD2), for the information volume VOL2, are located at the same predetermined distances from each other and the beginning of its program area PA2 as system area SA1 and volume descriptor VD1 of the information volume VOL1 are from each other and the beginning of its program area PA1. (Thus, the program areas PA1 and PA2 of both information volumes VOL1 and VOL2 are arranged in a similar fashion to that described with reference to FIG. 1).

In FIG. 4, the beginning of the system area SA2 is denoted by the logic sector number LSN=offs, where offs is an offset indicative of the distances between system area SA1 and system area SA2 in terms of logic sector numbers LSN. (As such, offs is also indicative of the distance between the volume descriptor VD1 and the volume descriptor VD2.) The beginning of the volume descriptor VD2 is denoted by logic sector number LSN=offs+16. The end of the volume descriptor VD2 is denoted by the logic sector number LSN=offs+SZ. The volume descriptor VD2 has the same format as the volume descriptor VD1 in the first information volume, i.e., VOL1. The volume descriptor VD2, however, may have a different length than the volume descriptor VD1. For that matter, as described in the ISO 9660 standard, a volume descriptor VD may comprise an arbitrary number of supplementary volume descriptors in addition to the primary volume descriptor. It is not necessary for the number of supplementary volume descriptors for volume descriptors VD1 and VD2 to be equal. However, the length of volume descriptor VD2 must not exceed that of volume descriptor VD1. The reason for this will be explained later on herein.

The volume descriptor VD2 comprises a reference to the sector address of a path table (referenced PT2) included in the program area PA2. The path table PT2 comprises information about the structure of the directories included in all of the user files (referenced F1, . . . , F6) in the first and second information volumes, i.e., VOL1 and VOL2. Furthermore, the path table PT2 comprises references to directory files DF. These directory files DF comprise information about the structure of the user files included in the directory concerned and references to the address of those user files. The latter references (i.e., references to user files) are denoted in the FIG. 4 by the reference numerals 40–45. In the embodiment of the layout of the disc shown in FIG. 4, the volume descriptor VD2 comprises a reference to the path table PT2 which comprises a reference to the directory files with the information necessary for accessing all user files F1, . . . ,F6 in both the information volumes VOL1 and VOL2.

Generally, a path table PT and directory files DF will all be included in the last-recorded information volume. In principle, however, it is alternatively possible for this information to be recorded partly or in full in sectors not included in that information volume. It is only essential for the information volume to comprise a reference or references to the necessary information.

Still further information volumes may be recorded contiguous to the information volume VOL2. Such information volumes are arranged in a fashion similar to that of information volumes VOL1 and VOL2 just described with reference to FIG. 4. Each includes a system area SA and a volume descriptor VD which are at the same predetermined distance from each other as volume descriptors VD1 and VD2 are from system areas SA1 and SA2, respectively. The distance between the system area SA of each additional information volume and the system area of the first-recorded information volume, i.e., VOL1 will be indicated by the offs value for that additionally-recorded information volume. (As before, the offs value for each additionally-recorded information volume will also be indicative of the distance between the volume descriptor VD of that information volume and the volume descriptor VD1 of the first-recorded information volume VOL1.) If additional information volumes are recorded, the last-recorded information volume is always to include a volume descriptor VD comprising a reference to a path table PT which contains information about the directory structure and references to the directory files DF for all user files in that information volume and at least part of, but preferably all, previously-recorded information volumes.

FIG. 5 shows a modification in the device driver DR of the operating system through which access can be gained to all the user files in all the information volumes. The modification comprises a detection step S1 for detecting whether the logic sector number LSN received from the file manager FM is located in the range O–SZ. This range includes the sector addresses of the volume descriptor VD1 in the first information volume, i.e., VOL1. If the received logic sector number LSN is located in this range, step S2 is executed. In that step, the received logic sector number is modified by adding thereto the value of offs for the last-recorded information volume. With respect to the disc track shown in FIG. 4, this entails that when there is a request for access to volume descriptor VD1 access is gained to volume descriptor VD2 in lieu of volume descriptor VD1. Through the volume descriptor VD2, access is gained to all the required information present in the path table PT2 and the directory files DF1', DF2' and DF3' for searching for all the user files in both information volumes VOL2 and VOL1. Hence all the user information on the disc is accessible.

For adequately modifying the logic sector numbers, the values of offs and SZ are to be known by the device driver DR. If these values are known to the operator of the reading apparatus, these values may be fed to the reading system by the operator in a customary fashion, for example, by means of a keyboard.

It is preferable, however, for a disc to comprise a reference to the sector addresses of a volume descriptor VD of each information volume recorded later on. This may be effected by including a reference to the sector address of the beginning of the volume descriptor VD in the lead-out, for example, in the sub-code information, of each subsequently-recorded information volume.

Figure 6:
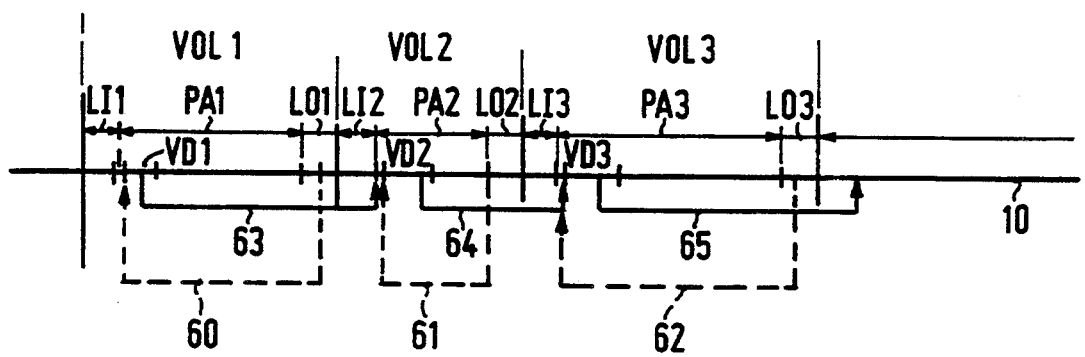

FIG. 6 shows by way of illustration a layout of the track 10 in which three information volumes VOL1, VOL2 and VOL3 are recorded. References to the beginning sector addresses of the volume descriptors VD1, VD2 and VD3 are contained in the lead-outs LO1, LO2 and LO3 of the corresponding information volumes denoted by the lines 60, 61 and 62, respectively. The lead-out LO of each information volume is situated at the end of the information volume.

Figure 8:
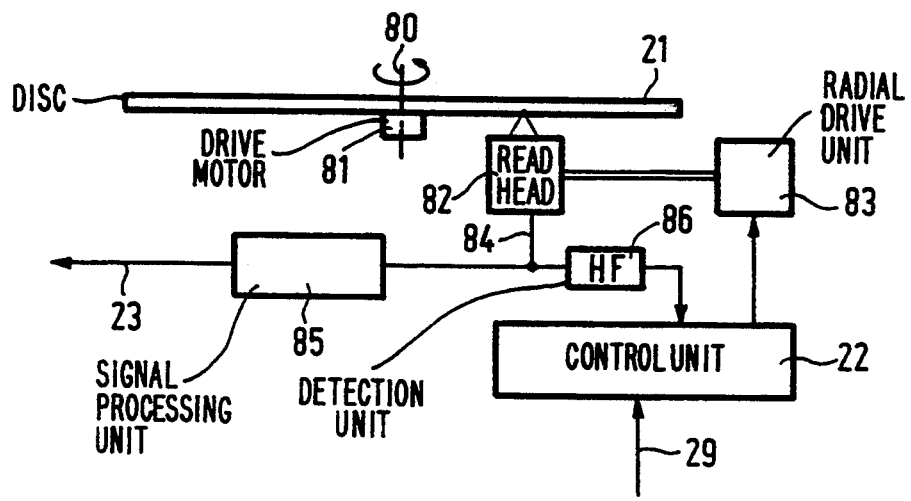
FIG. 8 shows an embodiment for a reading apparatus according to the invention.

The lead-out of the last-recorded information volume may be simply located by searching for the transition from the track portion in which information is recorded to a track portion in which no information has yet been recorded. For a detailed description hereof, reference can be made to European Patent Application 91200764.8, which is incorporated herein by reference and to which U.S. Pat. No. 5,341,356 corresponds. FIG. 8 diagrammatically shows a reading apparatus comprising a detection unit for detecting the end of the last-recorded information volume. The apparatus shown comprises a customary drive unit which includes a drive motor 81 for rotating the disc 21 around an axis 80. Opposite the rotating disc 21, an optical read head 82 is disposed which is radially movable relative to the disc 21 by means of a radial drive unit 83. The displacement caused by the drive unit 83 is controlled in a customary fashion by the control unit 22. Over a signal path 84, the read head 82 produces a read signal which is modulated according to the information pattern detected by the read head 82. This read signal is applied to the signal path 23, which is coupled to the system bus 24 of FIG. 2, through a customary signal processing unit 85. The read signal is also applied to a detection circuit 86. The detection circuit 86 is of a type with which the presence of a high-frequency component in the read signal can be established.

Figure 9:
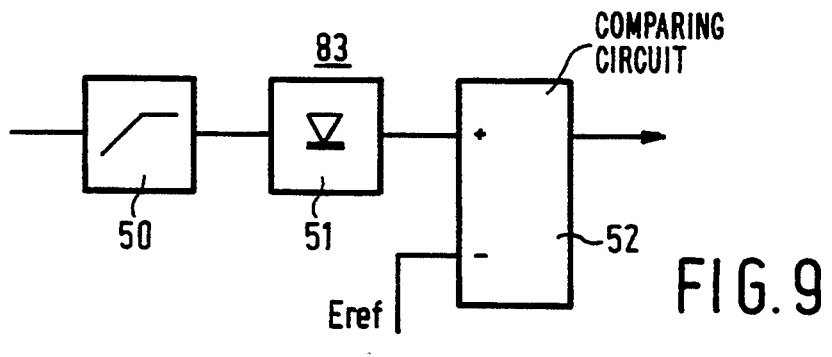
FIG. 9 shows an embodiment for a circuit to be used in a reading apparatus according to the invention.

FIG. 9 shows, by way of example, an embodiment of the detection circuit 86. That embodiment comprises a high-pass filter 50 whose input is coupled to the read head 82 for receiving the signal produced by the read head 82. An output of the high-pass filter 50 is coupled to a rectifier circuit 51. An output of the rectifier circuit 51 is coupled to a comparing circuit 52 for comparing the signal produced by the rectifier circuit 51 with a reference value Eref. When an information pattern is present in the sector of the record carrier 1 detected by the read head 82, the signal produced by the read head 82 will comprise a high-frequency signal component to be passed by the high-pass filter 50 and then rectified by rectifier circuit 51. When an information pattern is present, the output signal of the rectifier circuit 51 will comprise a relatively large d.c. voltage component which exceeds Eref; and the comparing circuit 52 will produce a signal denoting that the output signal of the read head comprises a high-frequency component and, thus, that information had been recorded in the detected sector of disc 21.

The output signal of the detection circuit 86 is applied to the control unit 22 of the reading apparatus. See FIG. 8. The control unit 22 may comprise a microcomputer of a customary type loaded with a suitable control program for searching for reference information at the end (e.g., in the lead-out LO) of the last-recorded information volume. Such reference information can indicate the location of a volume descriptor VD, e.g., the location of volume descriptor VD of the last-recorded information volume. See reference numeral 62 of FIG. 6. A flow chart of an embodiment for a suitable control program is shown in FIG. 10.

Figure 10:
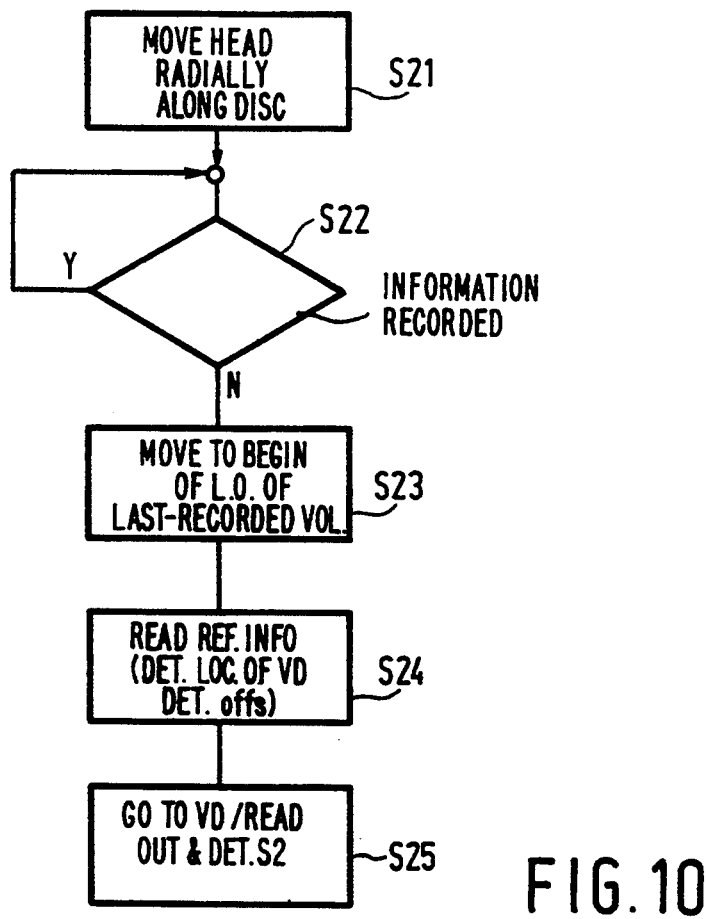

The program of FIG. 10 comprises a step S21 in which the drive unit 83 moves the read head 82 radially along the record carrier 21 from the beginning of the track under the control of the control unit 22. (See FIG. 8) In Step S22, in response to the output signal of the detection circuit 86, a determination is made as to whether information has been recorded in the sector of the disc 21 detected by the read head 32. Once the output signal of the detection circuit 86 denotes that no further information has been recorded in the detected sector, the displacement of the read head 82 is stopped in step S23, and the read head is moved in an opposite direction to about the beginning of the lead-out of the last-recorded information volume.

Subsequently, step S24 is executed. In that step, the reference information included in the lead-out is read out. This reference information identifies the location of a volume descriptor VD (e.g., the volume descriptor VD for the last-recorded information volume) and, as such, denotes the value of offs for that information volume. (It should be noted that the value of offs, which corresponds to the location of the system area SA of an information volume, can easily be determined from the location of its volume descriptor VD because they are always at a predetermined distance from each other as mentioned above.)

Finally step S25 is executed. In that step the volume descriptor identified by the read reference information is searched for and read out, and the value of SZ is determined. This value, i.e., SZ, may be determined, for example, by means of information about the length of the volume descriptor VD included in the volume descriptor VD. Alternatively, it is possible, to detect end of the volume descriptor VD by detecting a volume descriptor set terminator situated at the end of the volume descriptor VD.

It is also possible to include in each recorded information volume a reference to the addresses to be used for the recording of the volume descriptor VD for the next information volume to be recorded. In FIG. 6, these references are shown by the lines 63, 64 and 65.

Figure 7:
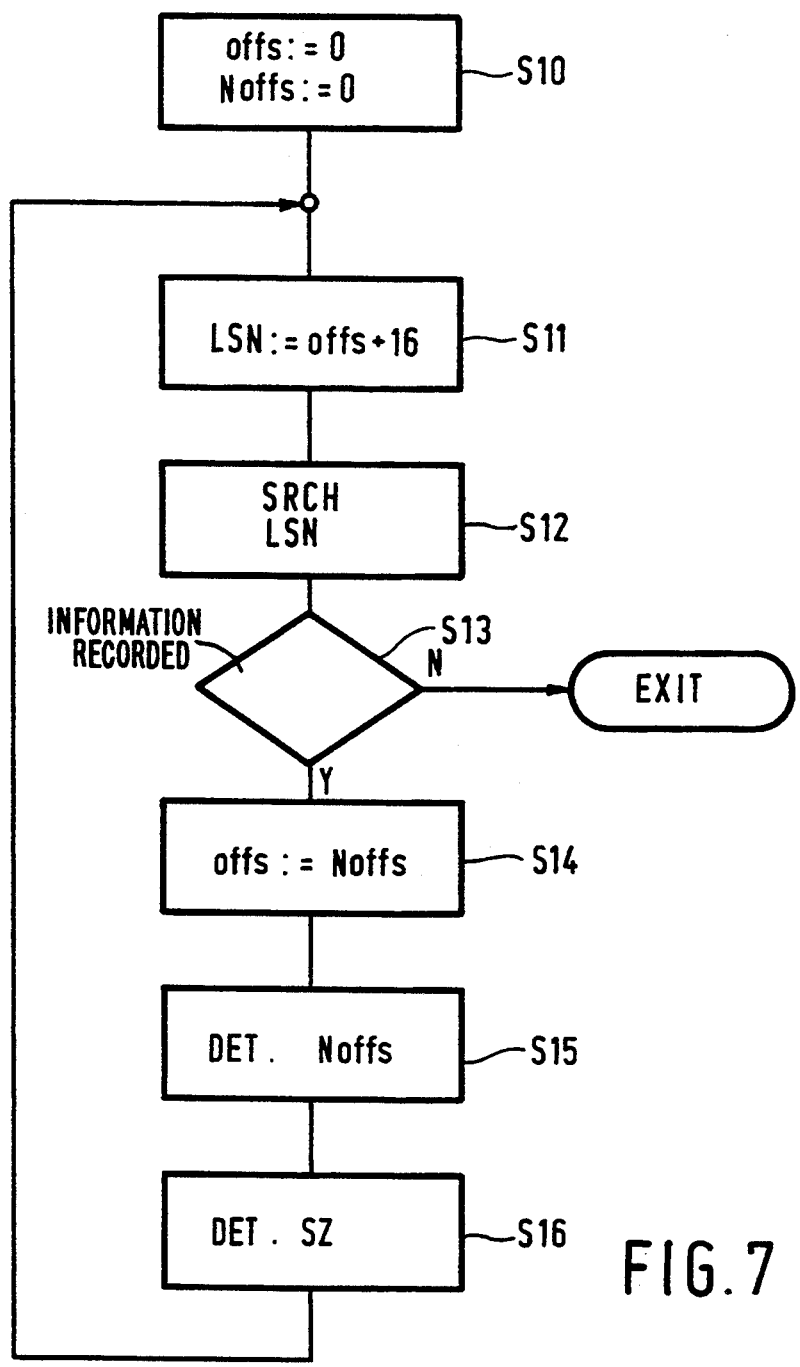

FIG. 7 shows an embodiment of a program for determining the values of offs and SZ for the last-recorded information volume of a record carrier in which the volume descriptor VD of each information volume comprises a reference to the addresses of the sectors in which a volume descriptor VD is recorded in the next information volume. In step S10 of the program, the value of offs and the value of a sub-variable Noffs are both made equal to zero. Step S10 is followed by step S11, where the logic sector number LSN of the address of a volume descriptor VD to be read is determined based on the instantaneous value of offs.

Subsequent to step S11, in step S12, the sector denoted by the logic sector number LSN is searched for. Then, in step S13 a determination is made as to whether information is recorded in the denoted sector. If there is, the value of offs is made equal to the value of Noffs in step S14.

Subsequently, in step S15, the volume descriptor VD denoted by the instantaneous value of the logic sector number LSN is read out (i.e., the volume descriptor VD of the current information volume); and the offs value for the volume descriptor of the next information volume is determined and assigned to Noffs, the offs value for the volume descriptor VD of the next information volume being determined based on the reference to (i.e., the logic sector number LSN OF) the volume descriptor VD of the next information volume referenced in the volume descriptor VD of the current information volume for the volume regulator VD of the current information volume is determined. The value of SZ for the volume descriptor VD of the current information volume may be determined on the basis of information about its length contained therein. However, it may also be effected by detecting the end of the volume descriptor VD denoted by its set terminator.

After step S16, step S11 is executed again. The program loop formed by the steps S11 and S16 is recurrently executed until during the execution of step S13 it is established that the sector denoted by the instantaneous value of LSN does not comprise any information. That is an indication that a sector has been detected which is located past the end of the track portion comprising information.

When the program loop of steps S11 to S16 stops, the instantaneous value of offs denotes, via step S11, the value of the logic sector number of the volume descriptor of the last-recorded information volume. The last determined value of SZ denotes the length of that volume descriptor. That length is to be smaller than the length of the volume descriptor in the first-recorded information volume. If it is not, that implies that a sector having a logic sector number LSN denoting a location past the end of the volume descriptor of the first-recorded information volume that is smaller than the value of SZ of the volume descriptor VD of the last-recorded information volume exists. A request for access to such a sector can lead to access of a sector of the volume descriptor VD in the last-recorded information volume, and therefore, that sector may no longer be accessible.

Figure 11:
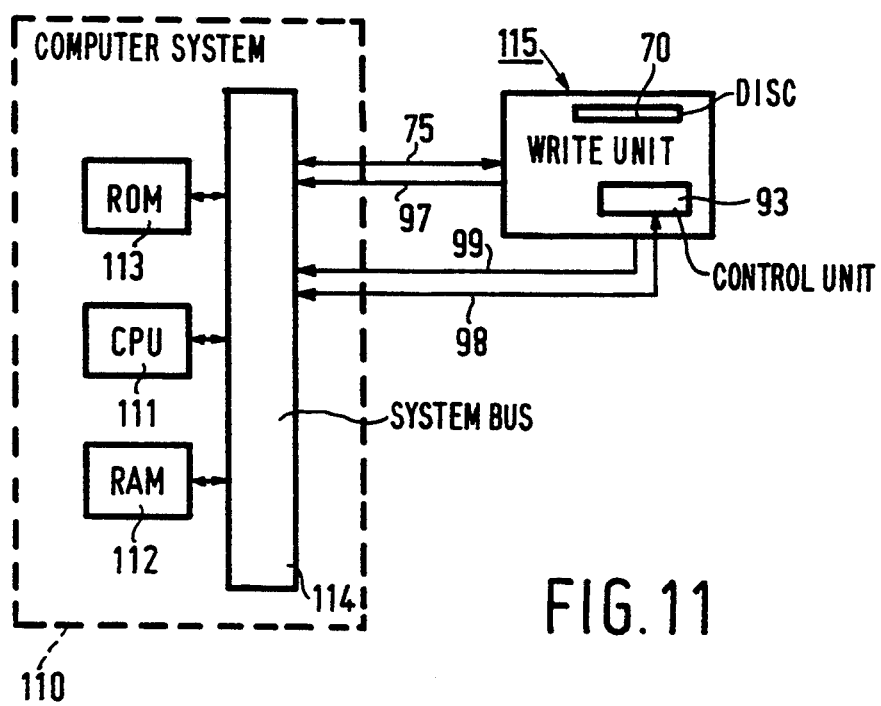
FIG. 11 shows an embodiment for a recording apparatus according to the invention.

FIG. 11 diagrammatically shows an embodiment for a recording apparatus according to the invention. The recording apparatus comprises a computer system 110 of a customary type, with a central processor 111, a RAM 112 and a ROM 113. The central processor 111, the RAM 112 and the ROM 113 are connected to a system bus 114 for mutual data transport. The recording apparatus further includes a write unit 115 for writing information on a disc 70 of a write-once type. The write unit 115 is connected to the system bus 114 over data signal paths 75 and 97 for receiving information to be recorded and supplying information that has been read out. The write unit 115 comprises a control unit 93 for controlling the writing operation. The control unit is connected to the system bus 114 over the control signal paths 98 and 99 for the exchange of control commands and control data between the control unit 93 and the computer system 110.

Figure 12:
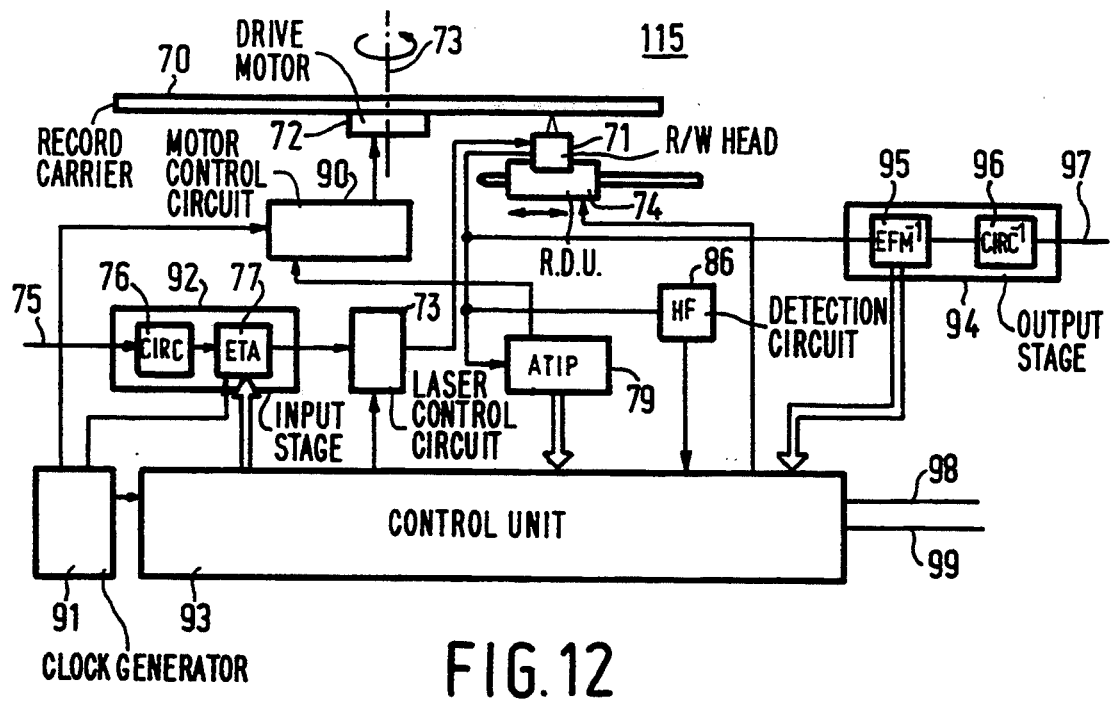
FIG. 12 shows an embodiment for a write unit to be used in the recording apparatus according to the invention.

FIG. 12 shows an embodiment for a write unit 115 suitable for recording CD signals such as, for example, CD-I, CD-ROM, CD-ROM XA and PHOTO-CD signals. In this Figure, reference numeral 70 denotes a CD-WO-type record carrier of the optical write-once type. Such a record carrier is described in detail in Patent Applications NL-A-8700655, NL-A-8800152, NL-A-8901275 and NL-A-8901145 which are incorporated herein by reference. The record carrier described in these Applications comprises a helical track displaying a periodic track modulation, whose frequency is modulated in accordance with a position information signal in the form of an absolute time code signal.

The write unit 115 shown in FIG. 12 comprises a drive motor 72 for moving the record carrier 70 around an axis 73 in a rotating fashion. An optical read/write head 71 of a customary type is disposed opposite the rotating record carrier 70. The optical read/write head 71 is movable in a radial direction by means of a radial displacing unit 74 ("RDU") which comprises, for example, a linear motor or spindle gearing.

Information formatted according to the CD-ROM format is supplied over the data signal path 75 of FIG. 12. The CD-ROM format is described, for example, in the IS0-9660 standard. The information supplied over the data signal path 75 is applied to an input stage 92 which rearranges the received information with the aid of a customary CIRC encoder 76, adds redundant information for error correction purposes and then converts the information by means of a customary EFM modulator 77 into an EFM modulated signal. The EFM modulated signal is applied to a laser control circuit 73 which transforms the EFM modulated signal into a suitable control signal for controlling a write laser used in the read/write head 71. A suitable embodiment for such a control circuit 73 is disclosed in detail in Patent Application NL-A-8800223 which is incorporated herein by reference.

In FIG. 12, an output stage 94 is inserted between an output of the read/write head 71 and a data signal path 97 for the purposes of recovering information (i.e., main information and sub-code information) that has been read out by the read/write head 71 and for supplying that information to the data signal path 97. For information recovery, the output stage comprises an EFM demodulator 95 and a CIRC decoder 96 of a customary type.

An ATIP detector 79 of a customary type, for example, described in the aforementioned Patent Application NL-A-8800152 is coupled to an output of the read/write head 71 of FIG. 12. Such an ATIP detector 79 recovers from detection signals produced by the read/write head the absolute time code represented by the FM modulated track modulation in the detected part of the track. Furthermore, the ATIP detector 79 produces a velocity signal having a frequency corresponding to the velocity with which the record carrier 70 is detected by the read/write head 71. This velocity signal is applied to a motor control circuit 90. The motor control circuit 90 of FIG. 12 also receives a clock signal having a reference frequency supplied by a clock generator 91. The motor control circuit 90 is of a customary type controlling the motor drive 72 in such a way that the frequency of the velocity signal is substantially maintained equal to the reference frequency of the clock signal. Such a motor control circuit 90 may consist of, for example, a PLL-motor velocity control circuit by which the motor is driven in response to the phase difference between the velocity signal and the clock signal. Outputs of the clock signal generator 91 are also coupled to clock inputs of the CIRC encoder 76 and the EFM modulator 77 so as to synchronize supplying of the EFM modulated signal by that input stage 92.

The arrangement shown in FIG. 12 also includes a detection circuit 86 of a type shown, for example, in FIG. 9. Such a circuit is able to detect a high-frequency signal component in a signal that has been read out by the read/write head 71 until the beginning of an unrecorded track portion is located.

Finally, the arrangement shown in FIG. 12 further comprises a control unit 93 for controlling the recording and reading operations. To supply sub-code information to the EFM modulator 77, the control unit 93 is coupled to sub-code inputs of the EFM modulator 77. To receive the sub-code information from the read signal, the control unit 93 is coupled to sub-code outputs of the EFM demodulator 95. The control unit 93 is further coupled to (a) outputs of the ATIP decoder 79 to receive the absolute time codes produced by the ATIP decoder 79, (b) the radial displacing unit 74 for controlling the radial displacement of the read-write head and the control circuit 73 for setting the apparatus to the read or write mode.

Figure 13:
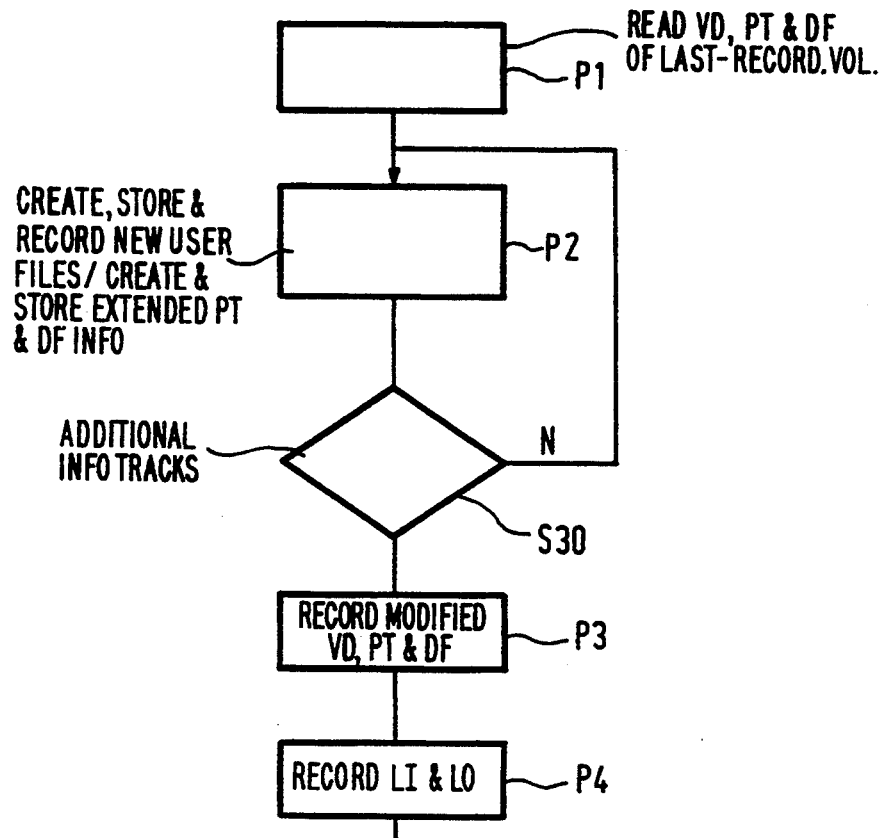
FIGS. 13, 14, 15, 17 and 18 show flow charts of programs executed by the recording apparatus according to the invention.

FIG. 13 shows a flow chart of a program for use in the computer system 110 of FIG. 11 for recording a next information volume. This program comprises a procedure P1 in which the computer system applies control commands to the control unit 93 over the control signal path 98 for reading the volume descriptor VD, the path table PT and the directory files DF from the last-recorded information volume. This read information is copied to the RAM 112. Procedure P1 is followed by procedure P2.

In procedure P2, new user files are created in a customary fashion formatted and temporarily stored in the RAM 112. In addition, the path table PT and directory files DF are extended by information about the newly created user files. Then, the newly created user files are recorded in a so called information track on the track of disc 70.

Next, in step S30, a determination is made as to whether more information tracks are to be recorded in the information volume. If so, step S30 is followed by procedure P2. If not, procedure P3 is executed, wherein the modified volume descriptor VD, path table PT and file directories DF are recorded on the disc 70. Subsequently, during the execution of procedure P4, the lead-in information is recorded in the lead-in and the lead-out information in the lead-out of the information volume.

Figure 14:
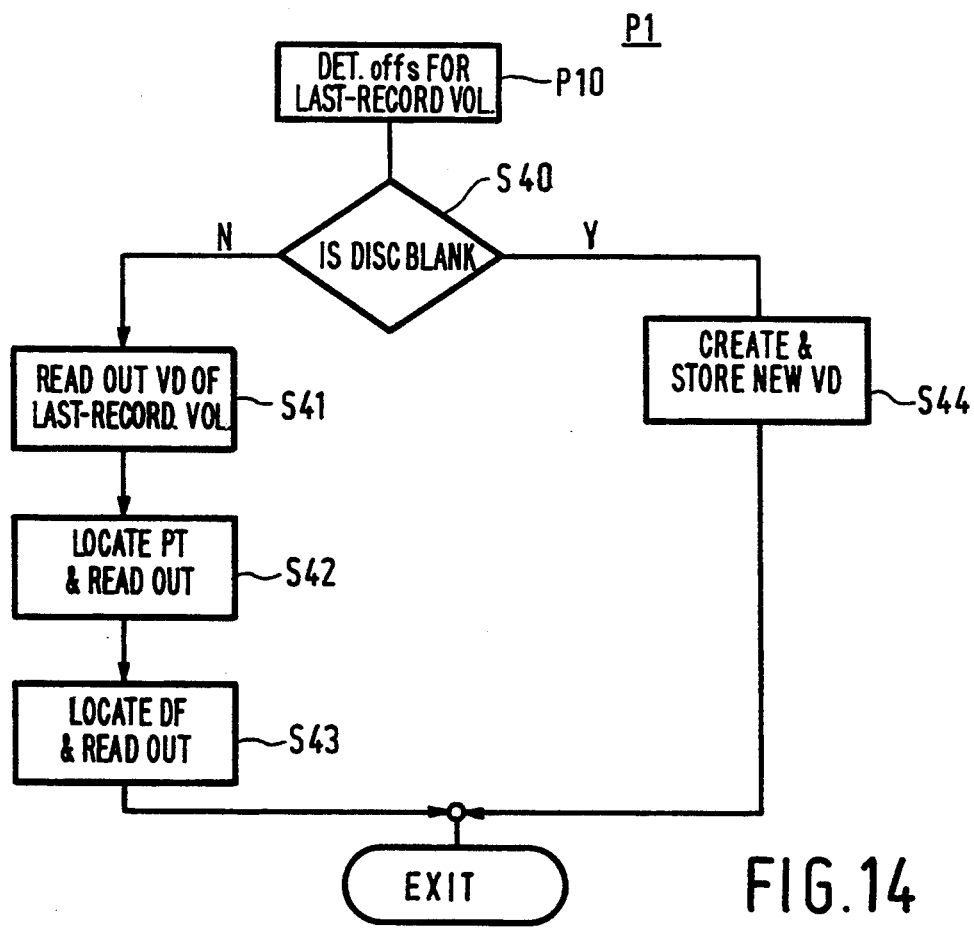

FIG. 14 shows a flow chart of an embodiment for the procedure P1. The procedure P1 is initiated by executing procedure P10 in which the value of offs of the last-recorded information volume is determined, for example, by means of a program comprising the steps S10 to S16 as shown in FIG. 7 or a program comprising the steps S21 to S25 as shown in FIG. 10. Once the procedure P10 has been executed, a determination is made in step S40 as to whether the disc 70 present in the write unit is completely blank or whether one or more information volumes have been recorded. thereon. This may be determined, for example, on the basis of the values of offs and Noffs in the case where the program shown in FIG. 7 is executed. When a disc 70 is completely blank, the program of FIG. 7 will be terminated after the test in step S13 has been made for the first time. This implies that the values of offs and Noffs are equal to zero when the program is terminated, which combination of values only occurs in a unrecorded disc 70. Alternatively, it is possible to verify, while the procedure P10 is being executed, whether information is already present on the disc 70 and, subsequently, locate a flag indicating that the disc 70 is unrecorded. If it is established, during the execution of step S40, that information volumes have already been recorded on the disc 70, the volume descriptor VD of the last-recorded information volume denoted by the value of offs, via step S11 of FIG. 7, for example, is read out in step S41, and the contents are copied to the RAM 112.

Subsequently, in the process of FIG. 14, step S42 is executed, wherein the logic sector number LSN of the path table PT is determined on the basis of the volume descriptor VD read out, and the path table PT is read out. The contents of the read-out path table PT are copied to the RAM 112. Furthermore, in step S43, the logic sector numbers LSN of the directory files DF are determined on the basis of the read-out path table PT, and these directory DF files are read out. The contents of the directory files DF are also copied to the RAM 112. Once step S43 has been executed, the procedure P1 is terminated.

In the case where it is established in step S40 that the disc 70 is completely blank, that step is followed by step S44. In step S44, a new volume descriptor VD is created and stored in the RAM 112.

Figure 15:
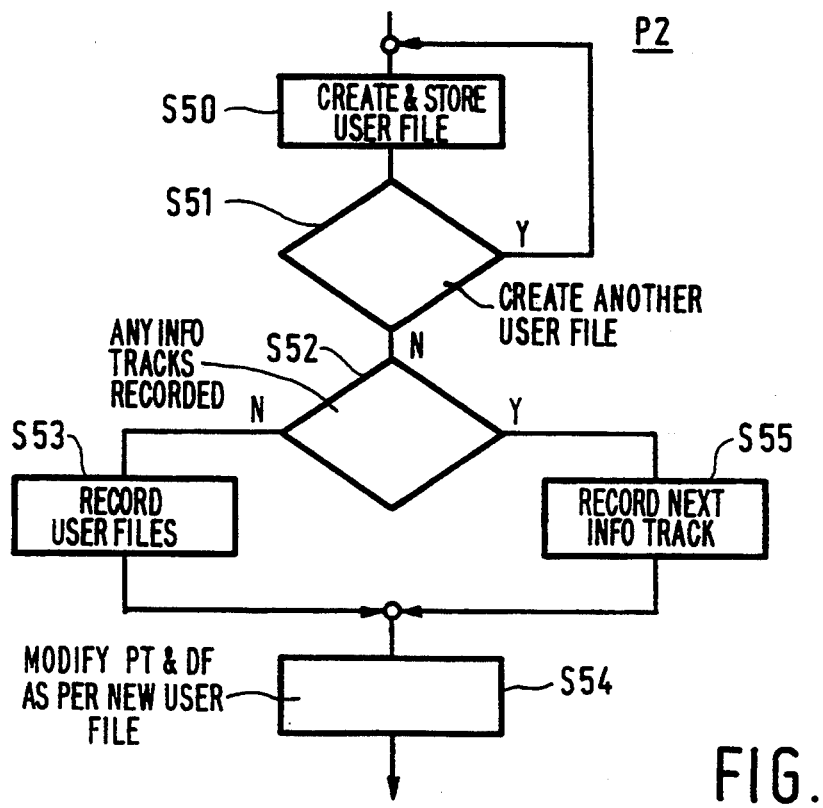

FIG. 15 shows a flow chart of an embodiment for the procedure P2. This procedure comprises a step S50 in which a user file is created, formatted and stored in the RAM 112 in a customary fashion. Subsequently, in step S51, a determination is made as to whether a next user file is to be added to the information track to be created. If so, step S50 is executed again. If not, step S52 is executed.

In step S52 of the process of FIG. 15, a determination is made as to whether one or more information tracks of the information volume to be recorded have actually been recorded. If no information track has yet been recorded for the information volume to be recorded, step S53 is executed, wherein the user files stored in the RAM 112 are recorded. These user files are recorded as a single information track. The recording is initiated in a sector which is located at a specific distance from the end of the previous information volume. This distance is to be selected sufficiently large for introducing a lead-in LI between the end of the last-recorded information volume and the beginning of the newly recorded information track, and for introducing a volume descriptor JD, a path table PT and directory files DF.

FIG. 16a shows by way of illustration the position of the first-recorded information track of a new information volume. In this Figure, the last fully recorded information volume is referenced VOLn−1. The first-recorded information track containing user files of the new information volume to be recorded (referenced VOLn) is referenced TRCK A. This information track comprises the user files F1', F2', F3', F4' and F5'.

Once information track TRCK A has been recorded, the path table PT and directory files DF present in the RAM 112 are modified by information concerning the newly recorded user files F1', . . . ,F5' during the execution of step S54. After step S54 has been executed, the procedure P2 is terminated.

When an information track (e.g., TRCK A of FIG. 16b) of an information volume to be recorded (e.g., VOLn of FIG. 16a), has actually been recorded, step S52 is followed by step S55. In the step S55 of FIG. 15, the next information track (e.g., the information track reference TRCK A+1 in FIG. 16b) is recorded adjoining the already recorded information track (e.g., TRCK A of FIG. 16b). This next information track also comprises one or more user files (referenced F6', F7' and F8' in FIG. 16b).

Once the step S55 of the process of FIG. 15 has been executed, step S54 is again executed, i.e., the path table PT and directory files DF are modified by information concerning the user files recorded in the new information track (e.g. TRCK A+1).

After step S54 of FIG. 15 has been executed, the procedure P2 is terminated. If no further user files need to be recorded in information tracks, procedure P3 will be started subsequent to procedure P2.

In the procedure P3, the volume descriptor VD, the path table PT and the directory files DF will be re-corded in an information track (e.g. the information track referenced TRCK A−1 in FIG. 16c) between the end of the last-recorded information volume (referenced VOLn−1, in FIG. 16c) and the beginning of the first track (referenced TRCK A in FIG. 16c) containing user files of the new information volume to be recorded, i.e., VOLn of FIG. 16c. Before commencing recording of an information track, such as, TRCK A−1, the sector addresses of the sector of information track TRCK A−1 in which the volume descriptor VD, the path table PT and the directory files DF are to be recorded are determined, and the reference information in the volume descriptor VD and path table PT is modified in accordance with the appropriate sector address(es) of these sector addresses.

Figure 17:
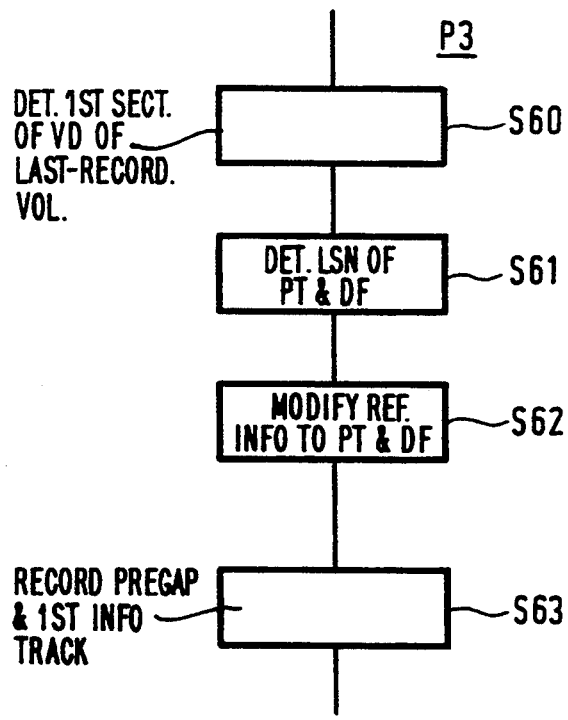

FIG. 17 shows a flow chart of an embodiment for procedure P3. This procedure is commenced by a step S60 in which the logic sector number LSN of the first sector of the volume descriptor VD of the last-recorded information volume is determined on the basis of information which denotes the logic sector number LSN of the last sector in the lead-out of that information volume. Subsequently, in step S61, the logic sector numbers LSN of the first sectors of the path table PT and the directory files DF are determined on the basis of the logic sector number LSN of the first sector of the volume descriptor VD and the size of the volume descriptor VD, path table PT and directory files DF. Then, in step S62, the reference information to the beginning of the path table PT and the directory files DF contained in the volume descriptor VD and the path table PT, respectively, is modified. The volume descriptor VD may comprise, as required, a reference to the sector intended for the recording of the volume descriptor VD of the information volume to be recorded next.

After step S62 of FIG. 17 step S63 is executed. In that step, the pregap preceding the information track TRCK A−1 of FIG. 16c, and information track TRCK A−1 itself are recorded. The recording is preferably such that the information track TRCK A−1 continues to the beginning of information track TRCK A of FIG. 16c. The information track portion between the last directory file DF and the beginning of information track TRCK A may be filled by sectors having dummy information, for example, sectors having only "0"-bits. Once step S63 has been executed, the procedure P3 is terminated and procedure P4 is commenced.

Figure 18:
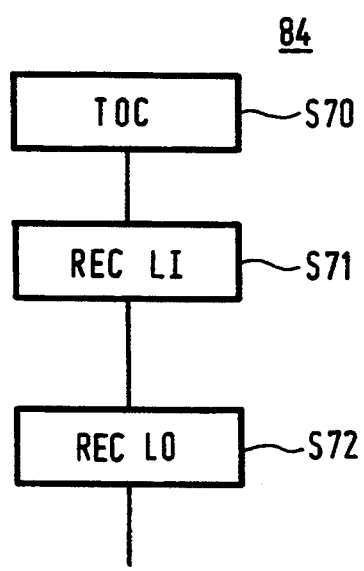

FIG. 18 shows a flow chart of an embodiment for the procedure P4. The procedure comprises a first step S70, wherein a Table of Contents (Toc) according to the format prescribed by the CD standard is assembled from the initial addresses of the information tracks included in the information volume. Subsequently, in step S71, information is recorded in the lead-in, i.e., LIn of FIG. 16d. The Table of Contents is included in the sub-code of the information recorded in the lead-in LIn of FIG. 16d.

Then, in step S72 of FIG. 18, the lead-out information is recorded in the lead-out, i.e., LOn of FIG. 16d. A reference to the initial address of the volume descriptor VD included in the information volume may then be included in the lead-out as required LOn as required. After the information has been recorded in the lead-in LIn and the lead-out LOn, the recording of the information volume is terminated, and the disc 70 can be read by means of the reading apparatus according to the invention.

The above describes an apparatus and method in which the information volume comprises a number of information tracks to be recorded in a number of separate recording sessions. Nonetheless, it is alternatively possible to have all information to be recorded included in the information volume in a memory at one time, and then record the complete information volume in a single recording session.

In the foregoing, the volume descriptor VD for the information volume to be recorded next is obtained by adapting the volume descriptor VD read out from the last-recorded information volume. Alternatively, it is possible to assemble this volume descriptor VD each time anew. It is only important that each new volume descriptor VD comprise a reference to files where the information necessary for controlling the search operation is available. The information referred to by the volume descriptor VD need not necessarily be recorded in the same information volume as the one in which the volume descriptor occurs.

The aforementioned embodiments relate to the recording of information formatted according to the CD-ROM standard. However, the invention is not restricted to recording this type of information. The invention may as well be applied to information formatted according to a different CD standard, such as, for example, the CD-I standard or the PHOTO-CD standard. Furthermore, the invention may be applied to each recording of information volumes in which control information for information search included in the information volumes is included in each information volume.

Finally, it should be observed that the invention is pre-eminently suitable for recording and reading information on/from write-once record carriers. The use of the invention, however, is not restricted to this. It may also be applied to recording and reading information on/from record carriers of the rewritable type.

I claim:

1. A method of recording information on a record carrier having a track, the method comprising:
   recording a first information volume as sectors having corresponding addresses in the track, the first information volume including a reference to control information for use in controlling the search for information in that first information volume, that reference being accommodated in one or more sectors in a predetermined address range; and
   recording at least one additional information volume as sectors having corresponding addresses in the track following the end of a last-recorded information volume, each additional information volume having a reference to substitute control information for use in controlling the search for information in that additional information volume and in at least one previously-recorded information volume, the reference to the substitute control information being accommodated in one or more sectors in a recoverable substitute address range.

2. The method as claimed in claim 1, wherein the size of the substitute address range is equal to the size of the predetermined address range.

3. The method as claimed in claim 1, wherein reference information is included at the end of each additional information volume, which reference information denotes at least one address corresponding to at least one or more sectors in the substitute address range.

4. The method as claimed in claim 1, wherein reference information is included at the end of each additional information volume, which reference information denotes at least one address intended to correspond to at least one sector accommodating the reference to the substitute control information for an additional information volume to be recorded next as sectors in the track.

5. The method as claimed in claim 4, wherein prior to the recording of each additional information volume, the end of the last-recorded information volume is determined based on the reference information included at least one previously-recorded additional information volume.

6. The method as claimed in claim 1, wherein prior to the recording of each additional information volume, the end of the last-recorded information volume is determined by detecting a transition from the end of a recorded part of the track to an unrecorded part of the track.

7. The method as claimed in claim 1, wherein the first information volume further includes the control information therefor.

8. The method as claimed in claim 1, wherein each additional information volume further includes the substitute control information therefor.

9. A recording apparatus for recording information on a record carrier having a track including a first information volume which has been recorded therein as sectors having corresponding addresses, the first information volume including a reference to control information for use in controlling the search for information in that first information volume, that reference being accommodated in one or more sectors in a predetermined address range, the apparatus comprising:
- recording means for recording at least one additional information volume as sectors having corresponding addresses in the track;
- deriving means for deriving additional control information for use in searching for information in each additional information volume; and
- control means for causing the recording means to (i) record each additional information volume following the end of a last-recorded information volume, (ii) record the additional control information applicable to each additional information volume, and (iii) record as part of each additional information volume a reference to substitute control information for use in controlling the search for information in that information volume and at least one previously-recorded information volume, the reference to the substitute control information being accommodated in one or more sectors in a recoverable substitute address range.

10. The apparatus as claimed in claimed in claim 9, wherein the size of the substitute address range is equal to the size of the predetermined address range.

11. The apparatus as claimed in claim 9, further comprising means for recording reference information as part of each additional information volume at the end thereof, which reference information denotes at least one address corresponding to at least one of the one or more sectors in the substitute address range.

12. The apparatus as claimed in claim 9, further comprising means for recording reference information as part of each additional information volume at the end of thereof, which reference information denotes at least one address intended to correspond to at least one sector accommodating the reference to the substitute control information for an additional information volume to be recorded next as sectors in the track.

13. The apparatus as claimed in claim 12, further comprising means for searching for the end of the last-recorded information volume based on the reference information included in at least one previously-recorded additional information volume.

14. The apparatus as claimed in claim 9, further comprising means for searching for the end of the last-recorded information volume by detecting a transition from a track portion with recorded information to a track portion in which no information has been recorded.

15. The apparatus as claimed in claim 9, further comprising formatting means for composing each additional information volume so that it includes the substitute control information applicable thereto therein.

16. The apparatus as claimed in claim 9, wherein the first information volume further includes the control information therefor therein.

17. A reading apparatus for reading a record carrier having a track in which information has been recorded as sectors therein, the sectors having corresponding addresses indicating the positions of the sectors in the track, one or more of the sectors being in a predetermined address range and accommodating a reference to control information for use in controlling the search for information arranged in other sectors, the apparatus comprising:
- address generating means for generating addresses corresponding to sectors to be search;
- control means for searching for information recorded in the track on the basis of the addresses generated by said address generating means; and
- substitution means for substituting an address from a substitute address range for an address generated by said address generating means when the address generated thereby corresponds to an address in the predetermined address range, the substitute address range corresponding to at least one sector accommodating a reference to substitute control information for use in controlling the search for information arranged in at least one of the sectors which cannot be searched for by the control information referenced by the reference accommodated in the one or more sectors in the predetermined address range.

18. The apparatus as claimed in claim 17, wherein the apparatus further comprises means for determining an offset value on the basis of information read from the record carrier, which offset value denotes the difference between an address of the predetermined address range and an address of the substitute address range; and said substitution means is adapted for augmenting one or more addresses of the predetermined address range by the offset value.

19. The apparatus as claimed in claim 18, further comprising range determining means for determining the length of the substitute address range on the basis of information read from the record carrier.

20. The apparatus as claimed in claim 19, wherein the range determining means is adapted for determining the length of the substitute address range from a predetermined sector in the predetermined address range or the substitute address range.

21. The apparatus as claimed in claim 19, wherein the range determining means is adapted for determining the length of the substitute address range through detecting at least one predetermined code denoting the end of that substitute address range in one or more of the sectors therein.

22. A record carrier having a track, comprising
- a first information volume having been recorded in the track as sectors having addresses, which information volume includes a reference to control information for use in controlling the search for information in that first information volume, that reference being accommodated in one or more sectors in a predetermined address range; and
- following to the first information volume is at least one additional information volume having been recorded in the track as sectors having addresses, each additional information volume includes a reference to control information for use in controlling the search for information in that additional information volume and in at least one information volume preceding it, the reference to control information being accommodated in one or more sectors in a recoverable substitute address range.

23. The record carrier as claimed in claim 22, wherein the size of the substitute address range is equal to the size of the predetermined information volume.

24. The record carrier as claimed in claim 22, wherein reference information is included at the end of each additional information volume, which reference information denotes at least one address corresponding to at least one of the one or more sectors in the substitute address range.

25. The method as claimed in claim 22, wherein reference information is included at the end of each additional information volume, which reference information denotes at least addresses intended to correspond to at least one sector accommodating the reference to the substitute control information for an additional information volume to be recorded next as sectors in the track.

26. The record carrier as claimed in claim 22, wherein the first information volume further includes the control information therefor.

27. The record carrier as claimed in claimed in claim 22, wherein each additional information volume further includes the substitute control information therefor.

28. A method of recording at least one additional information volume in a track of a record carrier having at least a first information volume recorded therein as sectors having corresponding addresses, the first information volume including a reference to control information for use in controlling the search for information in that first information volume and that reference being accommodated in one or more sectors in a predetermined address range, the method comprising:
   generating each additional information volume such that it includes a reference to substitute control information for use in controlling the search for information in that additional information volume and in at least one previously-recorded information volume; and
   recording each additional information volume as sectors having corresponding addresses in the track following the end of a last-recorded information volume, the reference to the substitute control information for that additional information volume being accommodated in one or more sectors in a recoverable substitute address range.

29. The method as claimed in claim 28, wherein the size of the substitute address range is equal to the size of the predetermined address range.

30. The method as claimed in claim 28, wherein reference information is included at the end of each additional information volume, which reference information denotes at least one address corresponding to at least one of the one or more sectors in the substitute address range.

31. The method as claimed in claim 28, wherein reference information is included at the end of each additional information volume, which reference information denotes at least one address intended to correspond to at least one sector accommodating the reference to the substitute control information for an additional information volume to be recorded next as sectors in the track.

32. The method as claimed in claim 31, wherein prior to the recording of each additional information volume, the end of the last-recorded information volume is determined based on the reference information included in at least one previously-recorded additional information volume.

33. The method as claimed in claim 28, wherein prior to the recording of each additional information volume, the end of the last-recorded information volume is determined by detecting a transition from the end of a recorded part of the track to an unrecorded part of the track.

34. The method as claimed in claim 28, wherein the first information volume further includes the control information therefor.

35. The method as claimed in claim 28, wherein each additional information volume further includes the substitute control information therefor.

* * * * *

UNITED STATES PATENT AND TRADEMARK OFFICE
CERTIFICATE OF CORRECTION

PATENT NO. : 5,390,159

DATED : FEBRUARY 14, 1995

INVENTOR(S) : ERIK C. SCHYLANDER

Page 1 of 4

It is certified that error appears in the above-indentified patent and that said Letters Patent is hereby corrected as shown below:

On the title page: Item [57]

Please delete the Abstract in its entirety and substitute the following therefor:

--ABSTRACT OF THE DISCLOSURE

A record carrier on which a first information volume (VOL1) is recorded as sectors in a track, the sector positions (i.e., addresses) on the track being denoted by logic sector address numbers LSN. The recorded information volume (VOL1) includes control information for use in controlling the search for information therein and a reference thereto, the control information being arranged according to a predetermined format and the reference being accommodated in a predetermined address range. Following the first information volume at least one additional information volume (VOL2) is recorded as

UNITED STATES PATENT AND TRADEMARK OFFICE
CERTIFICATE OF CORRECTION

PATENT NO. : 5,390,159

DATED : FEBRUARY 14, 1995

INVENTOR(S) : ERIK C. SCHYLANDER

It is certified that error appears in the above-indentified patent and that said Letters Patent is hereby corrected as shown below:

sectors in the track. Each additional information volume includes substitute control information for use in controlling the search for information in that information volume and in at least one previously- recorded information volume and a reference thereto. The reference to the substitute control information is accommodated in a recoverable substitute address range which is preferably the same size as the predetermined address range (of the first recorded information volume). Reading apparatus for such a record carrier transforms a request for access to sectors in the address range of the first information volume (VOL1) into a request for access to sectors in the substitute address range of the last-recorded information volume. A method and apparatus for recording information in the predetermined format is also disclosed.--.

UNITED STATES PATENT AND TRADEMARK OFFICE
CERTIFICATE OF CORRECTION

PATENT NO. : 5,390,159
DATED : February 14, 1995
INVENTOR(S) : Erik C. Schylander It is certified that error appears in the above-indentified patent and that said Letters Patent is hereby corrected as shown below:

IN THE CLAIMS

Col. 16,

Claim 3, line 4, after "least" insert --one of the--.

Claim 5, line 4, after "included" insert --in--.

Col. 18,
Claim 22, line 9, delete "to".

UNITED STATES PATENT AND TRADEMARK OFFICE
CERTIFICATE OF CORRECTION

PATENT NO. : 5,390,159
DATED : February 14, 1995
INVENTOR(S) : Erik C. Schylander Page 4 of 4

It is certified that error appears in the above-indentified patent and that said Letters Patent is hereby corrected as shown below:

Column 18, line 3, claim 23, change "information volume" to --address range --.

Column 19, line 1, claim 25, change "method" to --record carrier --.

Signed and Sealed this

Twenty-seventh Day of June, 1995

Attest:

BRUCE LEHMAN

Attesting Officer  Commissioner of Patents and Trademarks